United States Patent
Wellen

(10) Patent No.: US 7,409,154 B2
(45) Date of Patent: Aug. 5, 2008

(54) SYSTEM AND METHOD FOR A PROTECTED OPTICAL ACCESS RING NETWORK

(75) Inventor: Jeroen Siebrand Wellen, Leusden (NL)

(73) Assignee: Lucent Technologies Inc., Murray Hill, NY (US)

( * ) Notice: Subject to any disclaimer, the term of this patent is extended or adjusted under 35 U.S.C. 154(b) by 636 days.

(21) Appl. No.: 10/634,388

(22) Filed: Aug. 5, 2003

(65) Prior Publication Data

US 2005/0031249 A1    Feb. 10, 2005

(51) Int. Cl.
*H04B 10/08* (2006.01)
*H04B 10/20* (2006.01)
*G02F 1/00* (2006.01)
*H04J 14/00* (2006.01)

(52) U.S. Cl. .............. 398/19; 398/3; 398/12; 398/59; 398/67; 398/72

(58) Field of Classification Search ........... 398/3, 398/4, 5, 12, 19, 59, 66, 71, 72, 67, 70
See application file for complete search history.

(56) References Cited

U.S. PATENT DOCUMENTS

| 5,592,475 A | 1/1997 | Gliga et al. ................. 370/359 |
| 5,903,370 A * | 5/1999 | Johnson ......................... 398/4 |
| 6,470,032 B2 | 10/2002 | Dudriak et al. .............. 370/503 |
| 6,771,908 B2 * | 8/2004 | Eijk et al. ..................... 398/66 |
| 6,798,991 B1 * | 9/2004 | Davis et al. ................... 398/19 |
| 7,158,720 B1 * | 1/2007 | Mazzurco et al. .............. 398/4 |

OTHER PUBLICATIONS

IEEE Standards for Local Area Networks 802.5-1989 "Token Ring Access Method" published by The Institute of Electrical andElectronics Engineers Inc.
Fujimoto et al., "Broadband Subscriber Loop System Using Multi-Gigabit Intelligent Optical Shuttle Nodes", *Proceedings of the Global Telecommunications Conference and Exhibition (Globecom)*, Nov. 15-18, 1987, Tokyo, vol. 3, pp. 1449-1454.

* cited by examiner

*Primary Examiner*—M. R. Sedighian

(57) ABSTRACT

An optical access network employs a ring topology in which connections between the network units and between the network units and the optical line terminal are via a protection switch. The protection switch monitors connections from the optical network units to detect a loss of signal and, on detecting a loss of signal from an optical network unit, switches the respective optical network unit out of the ring, thus maintaining continuity of the ring topology.

18 Claims, 4 Drawing Sheets

SYSTEM AND METHOD FOR A PROTECTED OPTICAL ACCESS RING NETWORK

TECHNICAL FIELD

This invention relates generally to optical access networks and, more particularly, to protection switching in such networks.

BACKGROUND OF THE INVENTION

Optical access networks provide optical fiber connections between public networks and end-users. They offer an important solution for the implementation of broadband access networks. They combine a large transport capacity with the capability of serving a wide geographical area. They support connections from central network entities like local exchanges to residential network units and thus can be used to deploy concepts like fiber-to-the-home (FTTH) and fiber-to-the-curb (FTTC). Passive optical networks (PONs) have been studied for many years but, until now, successful commercial deployment was growing slowly.

One possible structure that has been suggested for optical access networks is the point-to-point structure, in which a separate fiber connection is provided between a central office and an optical network unit at each user end-point. This is conceptually simple and it is relatively simple to deal with failures in the fiber connections or in the end-point equipment, since a failure in one connection or one optical network unit does not affect users connected to other optical network units by other connections. However, the point-to-point structure, in some circumstances, suffers from the disadvantage that there may be very many fiber connections terminating in the same central office. For example, for a group of 32 optical network units, there would need to be 32 or 64 fibers connected to the central office, depending on whether the fiber connections were duplex connections, and 32 optical transceivers at the central office, one for each optical network unit.

It has been suggested to provide a single fiber connection (one or two fibers) from the central office to an optical switch situated outside the central office at a suitable location near the user end-points, a so-called "curb switch", with individual connections between the curb switch and each user's optical network unit. This means that there is only one fiber connection to the central office and one optical transceiver at the central office but, in the case of 32 end-points, the curb switch would need 33 optical transceivers, one for each optical network unit connection and one for the connection to the central office. Also, an optical switch is a sophisticated piece of apparatus, consuming a considerable amount of power and requiring management to monitor and, when necessary, rectify performance, so there are disadvantages in locating such a switch outside the central office. Furthermore, such equipment represents a considerable investment, and levels of use at the outer fringes of the network are likely to be low.

It has also been proposed to use a tree-and-branch topology, in which one fiber connection from an optical line terminal at a central office is connected to a passive optical splitter/combiner, which is in turn connected to optical network units by separate fiber connections. As with the curb switch, one fiber connection to the optical line terminal at the central office serves a number of end-users, but in this case the only equipment situated outside the central office is a passive device requiring little maintenance and no power supply. However, the number of user end-points that can be accommodated is limited because of the use of power splitters; the more optical network units there are, the less the power that reaches each one. Also, for upstream packet transmissions using time domain multiple access, synchronization is required to prevent collisions of packets and loss of data. U.S. Pat. No. 6,470,032, for example, shows a technique for synchronizing the clocks on such a network.

Another known network topology is the ring topology. In a ring network, the network units are connected in a series. There is a one-way connection from a line terminal at the central office to the first network unit in the series, one-way connections from each of the network units to the next in the series, and a one-way connection from the last network unit in the series back to a line terminal at the central office. It is a simple matter to prevent collisions between packets, for example by using a token ring arrangement, such as the IEEE 802.5 standard. Also, each network unit acts as a repeater. However, although the ring topology is useful for computer networks, where all the network units are accessible to central management, it is not currently favored for optical access networks, because the failure of one user's network unit causes a break in the ring and adversely affects all the users on the ring. Also, unauthorized or malicious usage is something that known ring topology networks cannot protect against.

SUMMARY OF THE INVENTION

According to the principles of the invention, an optical access network has a ring topology and employs a protection switch for monitoring the connections from the optical network units to detect a loss of signal from an optical network unit. The protection switch includes a plurality of switching elements, one for each optical network unit, responsive to the detection of loss of signal from the respective optical network unit to switch the respective optical network unit out of the series such that the continuity of the ring topology is maintained. When a network unit fails, the protection switch detects a loss of signal and switches the failed network unit out of the ring, thus preserving the continuity of the ring, and the service to other users.

In this manner, an optical access network according to the principles of the invention combines expandability and ease of collision avoidance without incurring the penalty of sensitivity to individual end-point failures. More specifically, since the optical access network uses the ring topology, it has the advantage of simple collision avoidance and the fact that each network unit acts as a repeater. The protection switch, however, removes the vulnerability of the ring topology to failure of individual network units by switching out failed network units while maintaining the continuity of the ring and in one form of the invention it also protects against possible unauthorized or malicious usage, by switching out failed network units while maintaining the continuity of the ring. Moreover, the protection switch can be of simple and robust construction, requiring little in the way of maintenance and power requirements.

BRIEF DESCRIPTION OF THE DRAWINGS

A more complete understanding of the invention may be obtained from consideration of the following detailed description of the invention in conjunction with the drawing, with like elements referenced with like reference numerals, in which.

DETAILED DESCRIPTION

Figure 1:
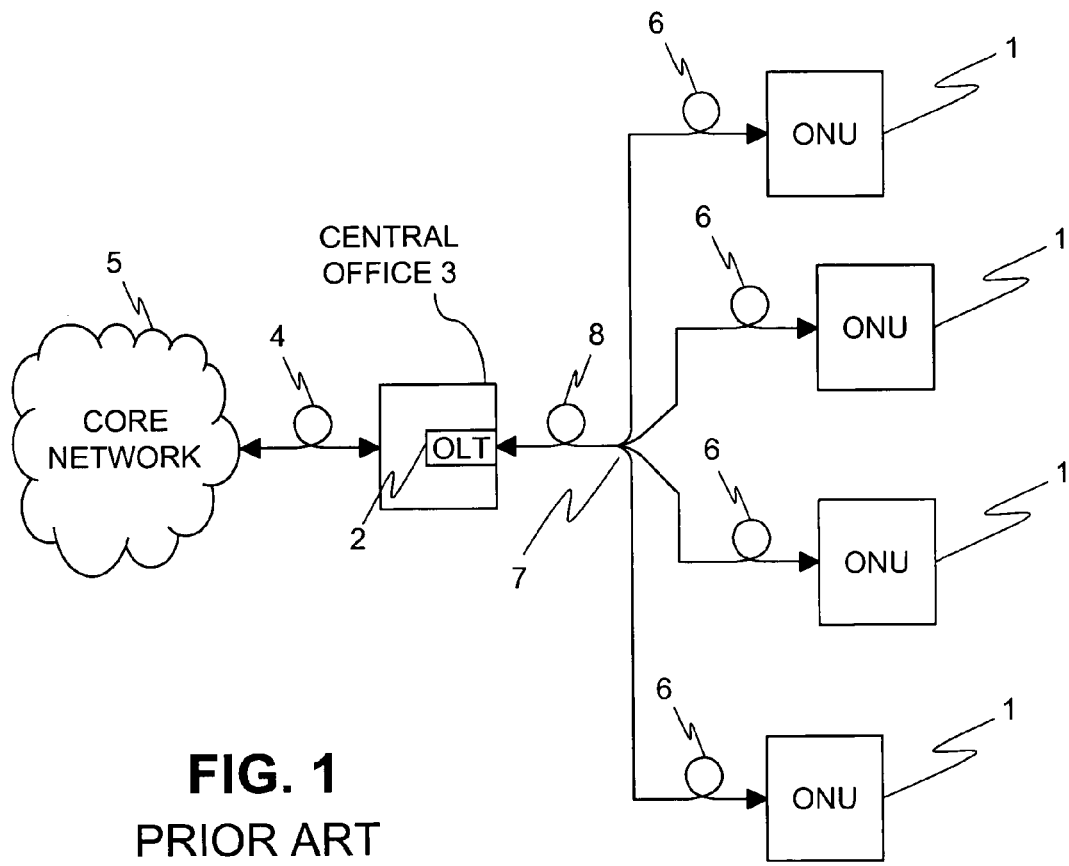
FIG. 1 shows a known optical access network having tree-and-branch topology, connected to a core network.

FIG. 1 shows a number of optical network units 1, situated at or near customer premises, connected to an optical line terminal 2 situated in a central office 3. The central office 3 is further connected via an optical fiber connection 4 to a core network 5. The connection between the optical network units 1 and the optical line terminal 2 is a so-called tree-and-branch topology. This topology consists of a plurality of individual optical fibers 6, one connected to each of the optical network units 1 and connected via a splitter/combiner 7 to a single optical fiber 8, which is connected to the optical line terminal 2. Thus, signals from optical line terminal 2 proceed via single optical fiber 8 to splitter/combiner 7 where they are divided and sent to all of the optical network units 1 via individual optical fibers 6. Since the power of the outgoing signals is divided by the splitter/combiner 7, the power reaching the optical network units 1 via the individual optical fibers 6 is reduced in proportion to the number of optical network units. Thus, there is a limitation on the expandability of the local network due to the reduction in power reaching the optical networks caused by the division of power at the splitter/combiner 7. Signals from the optical network units 1 proceed via the respective individual optical fiber 6 to the splitter/combiner 7, where they are directed to the optical line terminal 2. Since the optical network units 1 are transmitting independently and do not "hear" the transmissions from the other optical network units 1, it is necessary to provide synchronization between the transmissions from the optical network units 1 to prevent collisions of packets from the various optical network units 1 and consequent loss of data. The requirement for such synchronization complicates the expansion of the network, since the synchronization has to be adapted to the number of optical network units that are making transmissions to the optical line terminal 2.

Figure 2:
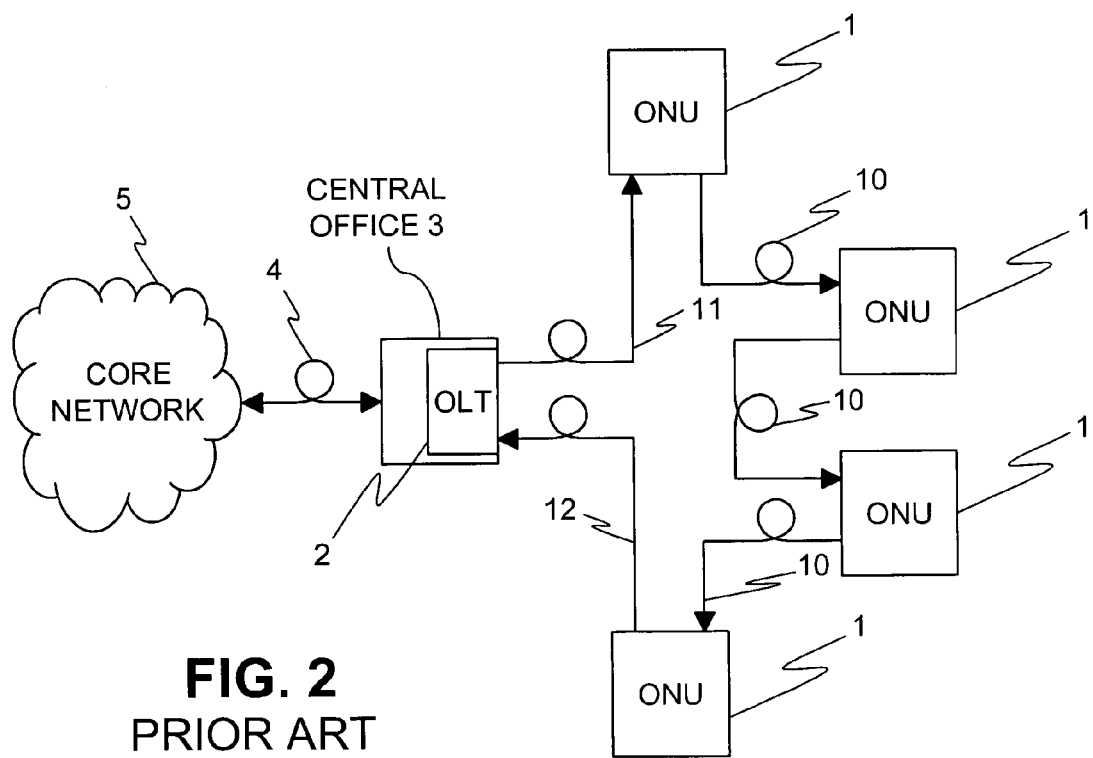
FIG. 2 shows a known optical access network having ring topology.

FIG. 2 shows a number of optical network units 1 connected to an optical line terminal 2 in a central office 3 by a so-called ring topology. In a ring topology, the optical network units 1 are connected together in a series by uni-directional optical fiber connections 10. The optical line terminal 2 is connected to the first optical network unit in the series by a unidirectional downstream optical fiber connection 11 and the last optical network unit in the series is connected to the optical line terminal 2 by a uni-directional upstream optical fiber connection 12. A message from the optical line terminal 2 to one of the optical network units 1 is sent via the downstream optical fiber connection 11 from which it passes to each of the optical network units in series until it reaches the optical network unit to which it is addressed. A message from an optical network unit 1 is passed along the series from one optical network unit to the next and finally to the optical line terminal 2 via the upstream optical fiber connection 12.

It is relatively simple to avoid collision between packets transmitted by optical network units in a ring topology network by use of a so-called "token ring" arbitration scheme. A distinctive message or "token" is sent from the optical line terminal 2 and is passed from one to the next of the optical network units 1 and back to the optical line terminal 2. The "token" gives permission to the optical network unit that currently holds it to transmit messages on the ring. When an optical network unit 1, which has a message to transmit, receives the token, it retains the token until it has transmitted its message. After it has transmitted its message, it passes the token to the next optical network unit in the series. Thus, optical network units 1 only transmit onto the ring when they are in possession of the "token". Since there is only one "token" on the ring at any time, only one optical network unit 1 can transmit at any time. Such a collision avoidance scheme is conceptually very simple and it is easy to expand the network by adding further optical network units. Furthermore, each of the optical network units 1 acts as a repeater, so there are no power limitation problems. Ring topology networks are useful in situations in which all of the optical network units 1 can be maintained and managed centrally. However, in situations such as an optical access network, in which the optical network units 1 are situated on customer premises and are therefore not available for central maintenance and management, the ring topology suffers from the disadvantage that a failure in any one of the optical network units 1 will cause a failure of the whole network.

Figure 3:
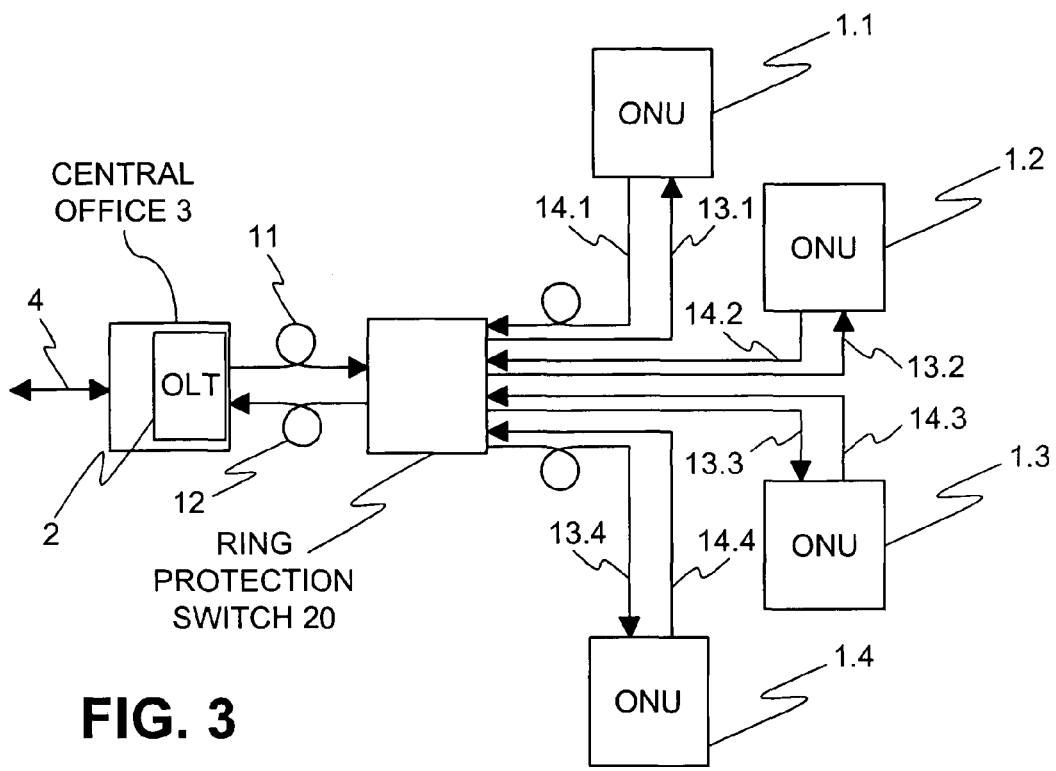
FIG. 3 shows an optical access network having a ring topology with a protection switch according to one illustrative embodiment of the invention.

FIG. 3 shows one illustrative embodiment of an optical access network according to the principles of the invention. The optical access network of FIG. 3 is a ring topology network in which the optical network units 1.1, 1.2, 1.3 and 1.4 are connected in series and in which the optical line terminal 2 is connected to the first optical network 1.1 in the series by a unidirectional downstream optical fiber connection 11 and the last optical network unit in the series 1.4 is connected to the optical line terminal 2 by a unidirectional upstream optical fiber connection 12. However, in the optical access network shown in FIG. 3, ring protection switch 20 is interposed between the downstream optical fiber connection 11 and the first of the optical network units 1.1, between the last of the optical network units 1.4 and the upstream unidirectional optical fiber connection 12, and between the optical network units of the series. Thus, optical line terminal 2 is connected to first optical network unit 1.1 via downstream connection 11 through ring protection switch 20 and via a first local downstream optical fiber connection 13.1. Optical network unit 1.1 is connected to optical network unit 1.2, which is the next in the series, by a first local upstream optical fiber connection 14.1, ring protection switch 20, and a second local downstream optical fiber connection 13.2, and so on. The last optical network unit 1.4 in the series is connected to optical line terminal 2 via a last local upstream optical fiber connection 14.4, ring protection switch 20, and upstream optical fiber connection 12. Thus, none of the optical network units 1.1 to 1.4 is connected directly either to optical line terminal 2 or to any other optical network unit, but only via the ring protection switch 20.

Ring protection switch 20 has the function of monitoring signals from optical network units 1.1 to 1.4. When switch 20 detects a loss of signal from one of the optical network units, it switches that optical network unit out of the ring and establishes connections accordingly. For example, if ring protection switch 20 detects a loss of signal from optical network unit 1.2 (e.g., indicating a failure), it would switch optical network unit 1.2 out of the ring so that optical network unit 1.1 will then be connected via ring protection switch 20 to optical network unit 1.3 instead of optical network unit 1.2.

Figure 4:
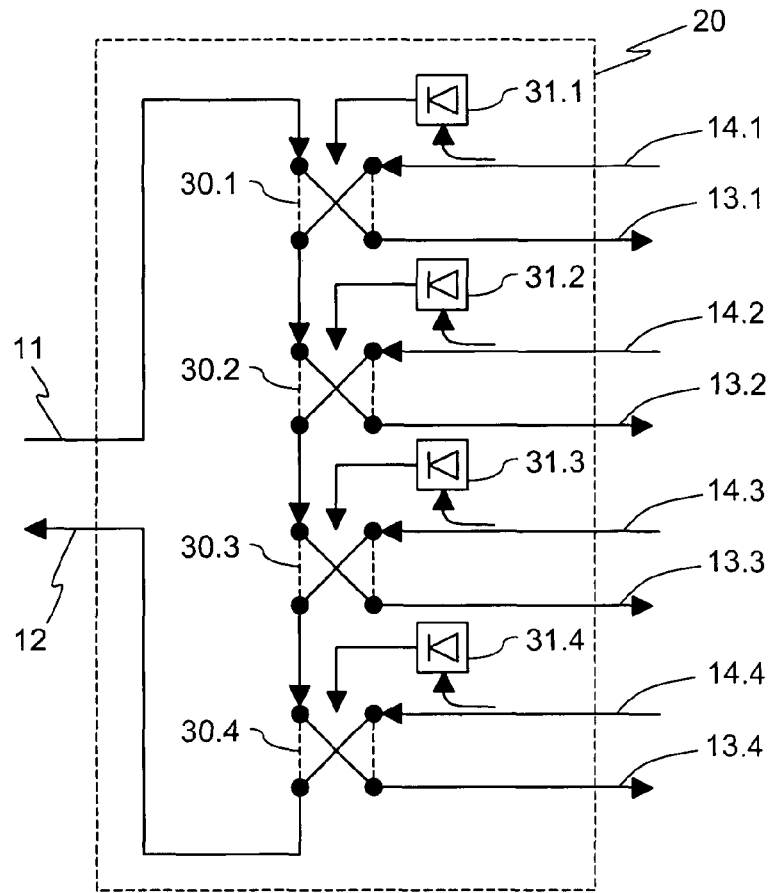
FIG. 4 shows an illustrative embodiment of a protection switch according to the principles of the invention.

FIG. 4 shows one illustrative embodiment of ring protection switch 20, which includes a number of cross-bar switches 30.1, 30.2, 30.3 and 30.4 connected in series. A port connected to downstream optical fiber connection 11 is connected to the first cross-bar switch 30.1 in the series, and the last cross-bar switch 30.4 in the series is connected to a port connected to upstream optical fiber connection 12. A port connected to the first local downstream optical fiber connection 13.1 and a port connected to the first local upstream optical fiber connection 14.1 are connected to the first of the switches 30.1.

In its "bar" state, the first switch 30.1 provides a straight through connection from the downstream optical fiber connection 11 to the second of the switches 30.2 and also connects the first local upstream optical fiber connection 14.1 to the first local downstream optical fiber connection 13.1. In its "cross" state, it connects the downstream optical fiber connection 11 to the first local downstream optical fiber connection 13.1 and connects the first local upstream optical fiber connection 14.1 to the next switch 30.2. Similarly, ports connected to the second local downstream and upstream optical fiber connections 13.2 and 14.2 are connected to the second of the switches 30.2, and so on.

Thus, when all of the switches 30.1 to 30.4 are in their "cross" state, the downstream optical fiber connection 11 is connected to the first local downstream optical fiber 13.1, the first local upstream optical fiber connection 14.1 is connected to the second local downstream optical fiber connection 13.2, the second local upstream optical fiber connection 14.2 is connected to the third local downstream optical fiber connection 13.3 and so on, and the last local upstream optical fiber connection 14.4 is connected to upstream optical fiber connection 12. Thus, optical network units 1.1 to 1.4 (FIG. 3) are connected to optical line terminal 2 in a ring topology.

Each of the switches 30.1 to 30.4 is associated with a respective photodetector 31.1 to 31.4, arranged to monitor optical signals on the respective local upstream optical fiber connection 14.1 to 14.4. Each of photodetectors 31.1 to 31.4 is connected to its respective switch 30.1 to 30.4 so that, while optical signals are being detected in the respective local upstream optical fiber connection 14.1 to 14.4, the respective switch 30.1 to 30.4 is kept in its "cross" state, but when a loss of signal is detected in the respective local upstream optical fiber connection 14.1 to 14.4, the respective switch reverts to its "bar" state.

Thus, as long as there are signals detected in all of the local upstream optical fiber connections 14.1 to 14.4, all of the switches 30.1 to 30.4 are in their "cross" state and all of the optical network units 1.1 to 1.4 of FIG. 3 are connected into the ring. However, when one of the optical network units, e.g., optical network unit 1.2, fails, a loss of signal is detected on the respective local upstream optical fiber connection 14.2 and the respective switch 30.2 reverts to its "bar" state, thus switching the failed optical network unit 1.2 out of the ring and maintaining the integrity of the ring for the other optical network units 1.1, 1.3 and 1.4. Since the switches 30.1 to 30.4 are cross-bar switches, when one of the optical network units 1.2 fails, as well as switching that optical network unit out of the ring, the respective local upstream optical fiber connection is connected to its corresponding local downstream optical fiber connection, thus connecting the output of the failed optical network unit 1.2 to its input and facilitating testing procedures. This is an advantage, but of course the ring protection switch 20 would also work with Y switches instead of cross-bar switches. Protection switching at higher layers, that is to say protection against errors other than complete failure, can be induced by forcing the transmitters of the optical network units to shut off when errors occur.

Figure 5:
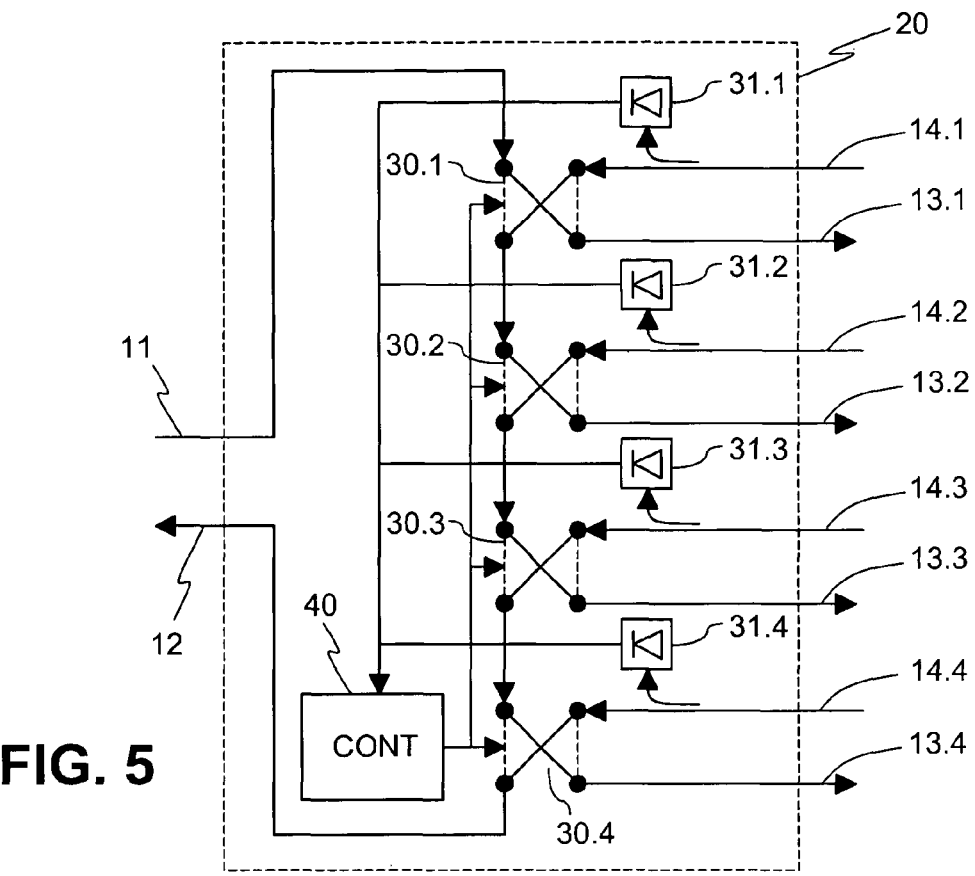
FIG. 5 shows another illustrative embodiment of a protection switch according to the principles of the invention.

FIG. 5 shows another illustrative embodiment of ring protection switch 20 in which photodetectors 31.1 to 31.4, instead of being connected directly to their respective switches 30.1 to 30.4, are connected to a controller 40 which, in turn, is connected to switches 30.1 to 30.4. One advantage of this arrangement is that controller 40 can intercept the status of the loop including an optical network unit before including it in the ring. This allows for inserting new optical network units into the ring without losing any upstream or downstream data. By frequently allocating non-data periods, switches 30.1 to 30.4 can be polled for new optical network units.

The ring protection switches of FIG. 4 or 5 can be realized in a very compact module design, especially if switches 30.1 to 30.4, photodiodes 31.1 to 31.4, and control electronics 40 are integrated in one single chip. The switches may be implemented by semi-conductor opto-electronic gates or microelectromechanical mirrors, by way of a few examples. Some of the practical advantages are that the ring protection switch can be installed in the field, has low power requirements, and requires no management. Since it is bit rate independent, and since the ring topology has the advantage that the optical network unit themselves act as repeaters, the optical access network is readily scaleable.

Figure 6:
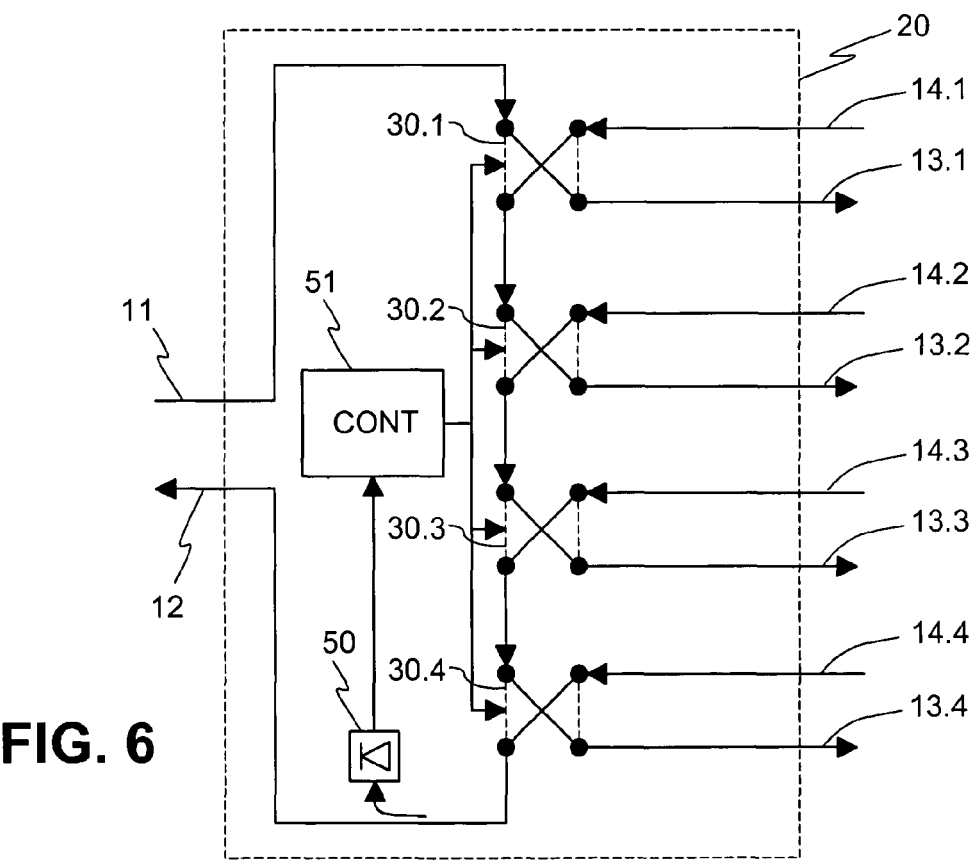
FIG. 6 shows another illustrative embodiment of a protection switch according to the principles of the invention.

FIG. 6 shows a simplified form of ring protection switch 20 according to another illustrative embodiment. In this embodiment, there is only one photodetector 50, which monitors the signals in the loop. Photodetector 50 is connected to controller 51, which, when a loss of signal in the loop is detected, polls switches 30.1 to 30.4 in turn to discover which of the optical network units has failed, and then switches that optical network unit out of the loop. A physical layer protocol must ensure that all connected optical network units transmit a signal whether they receive valid data or not. This simplified structure, with only one photodetector, allows a more simplified integrated photonic circuit, possibly a polymer optic device.

Figure 7:
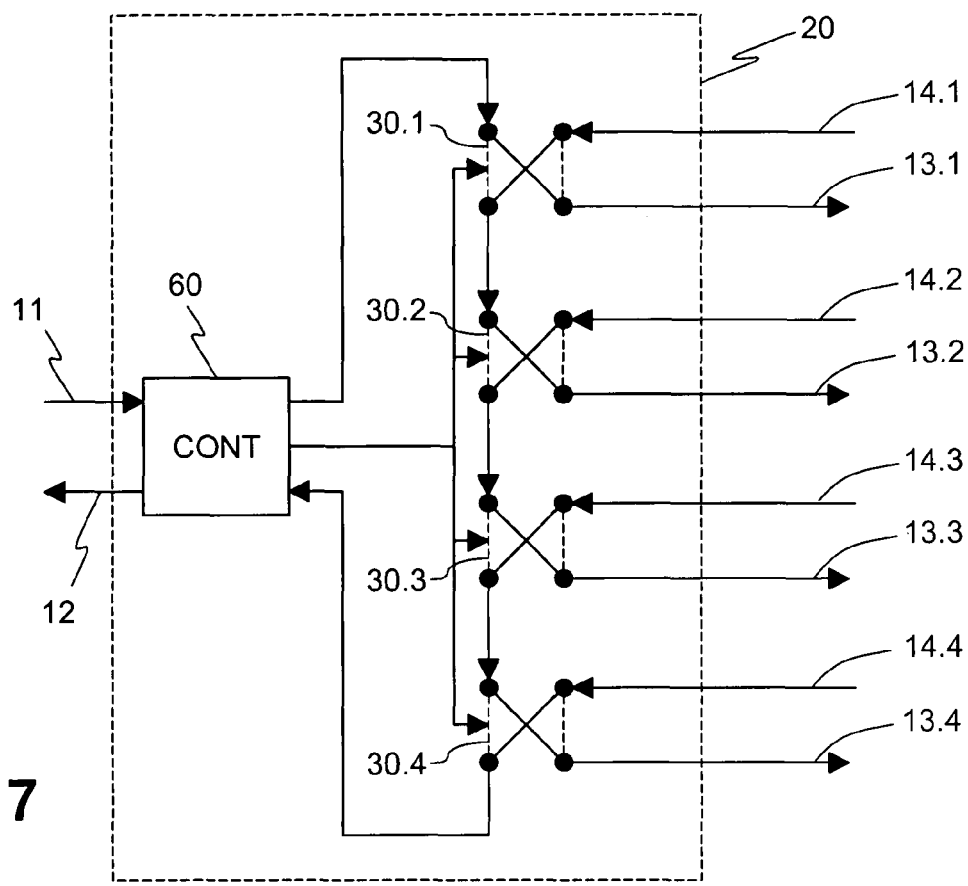
FIG. 7 shows another illustrative embodiment of a protection switch according to the principles of the invention.

FIG. 7 shows a modified form of ring protection switch 20 according to another illustrative embodiment. In this embodiment, controller 60 receives and transmits incoming and outgoing signals to and from the loop. It can now not only detect when a loss of signal in the loop is detected, but also detect malicious or unauthorized usage of an optical network unit, and block again by means of switches 30.1 to 30.4.

Figure 8:
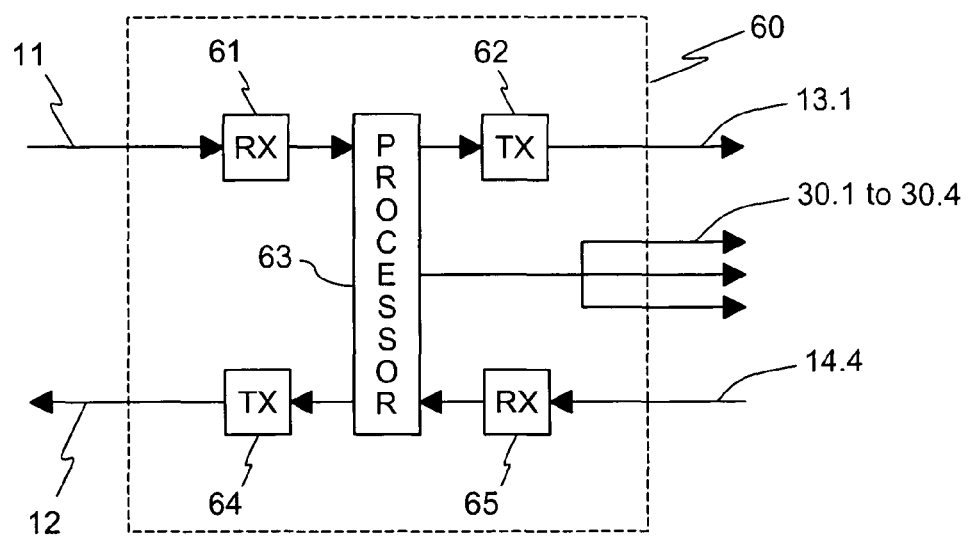
FIG. 8 shows an illustrative embodiment of a controller that can be used in the protection switch shown in FIG. 7.

FIG. 8 shows a detailed view of controller 60 from FIG. 7 according to one illustrative embodiment. Data from downstream fiber connection 11 is received by receiver (RX) 61 and processed by processor 63 to include the ring protocol and to encrypt the user data. The signal is then sent by transmitter (TX) 62 to the first network through fiber connection 13.1. The ring returns from fiber connection 14.4 and is received by receiver 65. Processor 63 decrypts the user data and transmitter 64 transmits the user data on upstream fiber connection 12. When processor 63 detects a loss of signal, it will execute a polling process, e.g., similar to that used by controller 51 of FIG. 6, to determine the faulty network unit and exclude it from the ring by switching switches 30.1 to 30.4 accordingly. Otherwise, it may monitor the data itself to detect any malicious use and exclude the proper network unit similarly.

In this manner, controller 60 is capable of running an access protocol and performing encryption and decryption of user data autonomously without involvement of a central office 3. Another advantage is that this embodiment allows for cheaper components in the optical network units, since controller 60 acts as a repeater, so the maximum distance to which the network units need to transmit is reduced to the distance between units rather than the distance to the central office.

For the purpose of teaching the principles of the invention, various embodiments have been described herein, but these embodiments are considered to be illustrative and not restrictive in any way. It will be apparent to the person skilled in the art that other alternative embodiments can be conceived and reduced to practice without departing from the spirit and scope of the invention, the scope of the invention being only limited by the claims appended hereto.

What is claimed is:

1. An optical access network including a plurality of optical network units coupled to an optical line terminal in a ring topology, in which the optical network units are connected together in a series, the optical line terminal being connected to a first optical network unit in the series and a last optical network unit in the series, and wherein each of the connections to and from each optical network unit is via a protection switch, the protection switch comprising:
   means for monitoring the connections from the optical network units to detect a loss of signal from the optical network units, and
   a plurality of switching elements, one for each optical network unit, responsive to the detection of loss of signal from a respective optical network unit to switch the respective optical network unit out of the series such that continuity of the ring topology is maintained among remaining of the plurality of optical network units.

2. The optical access network of claim 1, wherein the plurality of switching elements are cross-bar switches arranged so that, when the respective optical network unit is switched out of the series, the connections to and from the respective optical network unit are connected together.

3. The optical access network of claim 1, wherein the means for monitoring comprises a plurality of photodetectors, each photodetector being arranged to detect signals on the connection from a different optical network unit.

4. The optical access network of claim 3, wherein each photodetector is arranged to control its respective switching element directly.

5. The optical access network of claim 3, wherein the protection switch further comprises a controller coupled to the photodetectors, the controller being adapted for controlling the plurality of switching elements.

6. The optical access network of claim 1, the protection switch further comprising a controller arranged to control the plurality of switching elements, wherein the means for monitoring comprises a photodetector connected to the controller and arranged to monitor optical signals in the ring, the controller being arranged to toggle at least one of the plurality of switching elements in the event of a loss of signal in the ring to identify a faulty connection.

7. The optical access network of claim 1, wherein the means for monitoring comprises a controller arranged to control the plurality of switching elements, the controller including:
   a first receiver coupled to the optical line terminal for receiving downstream optical signals from the optical line terminal;
   a first transmitter for re-transmitting the downstream optical signals to the first optical network unit in the series;
   a second receiver for receiving upstream optical signals from the last optical network unit in the series;
   a second transmitter for re-transmitting the upstream optical signals to the optical line terminal; and
   a processor arranged to control the switching elements, the processor being arranged to toggle at least one of the plurality of switching elements in the event of a loss of signal in the ring to identify a faulty connection.

8. The optical access network of claim 7, wherein the processor is further arranged to detect malicious or unauthorized usage of an optical network unit and to cause at least one of the plurality of switching elements to switch the optical network unit subject to such usage out of the series.

9. The optical access network of claim 7, wherein the processor is further arranged to process the upstream and downstream optical signals prior to re-transmission, and wherein the processing includes implementing at least one of a ring protocol and encryption.

10. A protection switch for an optical access network comprising a plurality of optical network units connected to an optical line terminal in a ring topology in which the optical network units arc connected together in a series, the optical line terminal being connected to a first optical network unit in the series and a last optical network unit in the series, and wherein each of the connections to and from each optical network unit is via a protection switch, the protection switch comprising:
    at least one signal monitor for monitoring the connections from the optical network units to detect a loss of signal from the optical network units, and
    a plurality of switches, one for each optical network unit, responsive to the detection of loss of signal from a respective optical network unit to switch the respective optical network unit out of the series such that continuity of the ring topology is maintained among remaining of the plurality of optical network units.

11. The protection switch of claim 10, wherein each of the plurality of switches are cross-bar switches arranged so that, when the respective optical network unit is switched out of the series, the connections to and from the respective optical network unit are connected together.

12. The protection switch of claim 10, wherein the at least one signal monitor comprises a plurality of photodetectors, each photodetector being arranged to detect signals on the connection from a different optical network unit.

13. The protection switch of claim 12, wherein each photodetector is arranged to control its respective switching means directly.

14. The protection switch of claim 12, further comprising a controller, the controller being coupled to the photodetectors and being adapted for controlling the plurality of switches.

15. The protection switch of claim 10, further comprising a controller arranged to control the plurality of switches, wherein the at least one signal monitor comprises a photodetector connected to the controller and arranged to monitor optical signals in the ring, the controller being arranged to toggle at least one of the plurality of switches in the event of a loss of signal in the ring to identify a faulty connection.

16. The protection switch of claim 10, wherein the at least one signal monitor comprises a controller arranged to control the plurality of switches, the controller including:
    means for receiving downstream optical signals from the optical line terminal;
    means for re-transmitting said downstream signals to the first optical network unit in the series;
    means for receiving upstream optical signals from the last optical network unit in the series;

means for re-transmitting said upstream optical signals to the optical line terminal; and a processor arranged to control the plurality of switches, the processor being arranged to toggle at least one of the plurality of switches in the event of a loss of signal in the ring to identify a faulty connection.

17. The protection switch of claim 16, wherein the processor is further arranged to detect malicious or unauthorized usage of an optical network unit and to cause at least one of the plurality of switches to switch the optical network unit subject to such usage out of the series.

18. The protection switch of claim 16, wherein the processor is further arranged to process the upstream and downstream optical signals prior to re-transmission, and wherein the processing includes implementing at least one of a ring protocol and encryption.

\* \* \* \* \*